United States Patent [19]

Noyes et al.

[11] 4,290,059
[45] Sep. 15, 1981

[54] LIQUID LEVEL ALARM FOR REMOTELY INDICATING WHEN LESS THAN A PREDETERMINED QUANTITY OF FUEL OIL REMAINS IN A STORAGE TANK AND METHOD FOR INSTALLING THE SAME

[76] Inventors: Walter O. Noyes, 308 Elm St., Bennington, Vt. 05201; John M. Helft, Center Rd., Eagle Bridge, N.Y. 12057

[21] Appl. No.: 138,163

[22] Filed: Apr. 7, 1980

[51] Int. Cl.³ ............................................. G08B 21/00
[52] U.S. Cl. ...................................... 340/624; 73/308; 200/84 C
[58] Field of Search ............... 340/618, 623, 624, 625; 200/84 C; 73/322, 308

[56] References Cited

U.S. PATENT DOCUMENTS 3,359,799 12/1967 Lubin .............................. 73/322 X
3,942,526 3/1976 Wilder et al. .................... 340/624 X Primary Examiner—John W. Caldwell, Sr.
Assistant Examiner—Daniel Myer Attorney, Agent, or Firm—Parmelee, Johnson, Bollinger and Bramblett

[57] ABSTRACT

The present invention provides an improvement by adaptation of a rising stem fuel oil gauge for indicating, at a remote location, the quantity of fuel in oil storage tanks commonly used in homes and businesses. The improvement includes a magnet carried on a horizontally positioned level indicating disc, which is attached to the upper end of a vertically rising stem and enclosed within a transparent tube. Markings on the tube correspond to the quantity of fuel oil within the storage tank and the alignment of the indicating disc with a specific marking indicates the fuel oil quantity at any given time. A magnetically actuated reed switch is mounted to the exterior of the tube at a predetermined position, and a power supply and remote alarm are coupled to the switch. When the level of the indicating disc is near the position at which the switch is mounted, the magnet carried on the disc actuates the switch which in turn actuates the remote alarm. The system thus provides an alarm when the quantity of fuel within the storage tank corresponds to that predetermined quantity corresponding to the level at which the magnetic switch is mounted on the tube.

12 Claims, 4 Drawing Figures

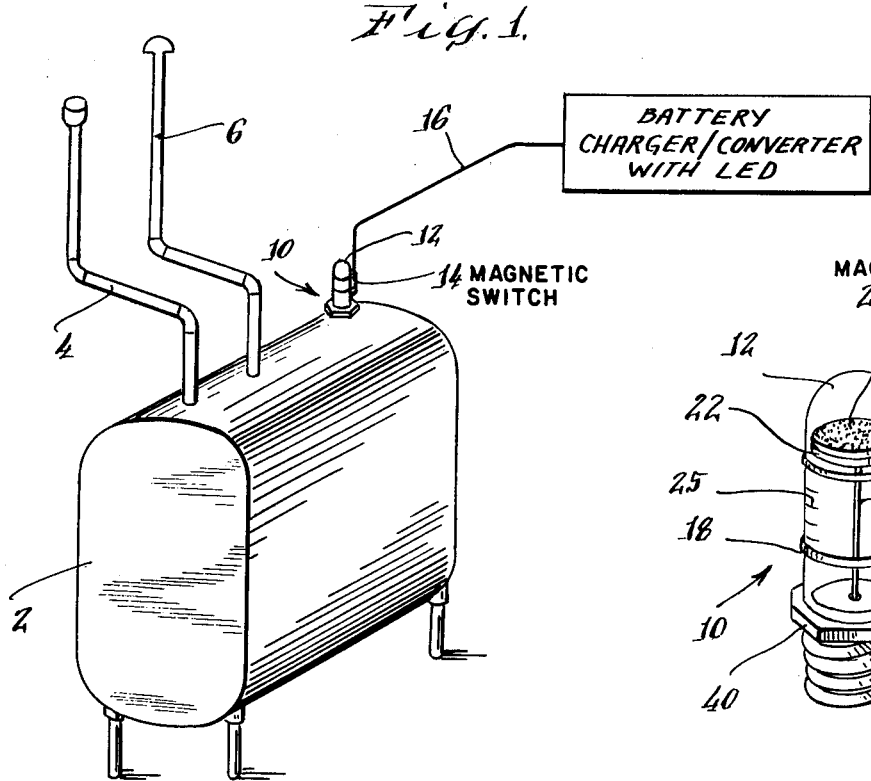
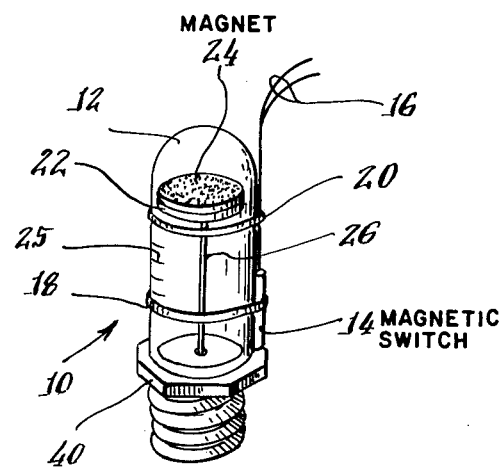
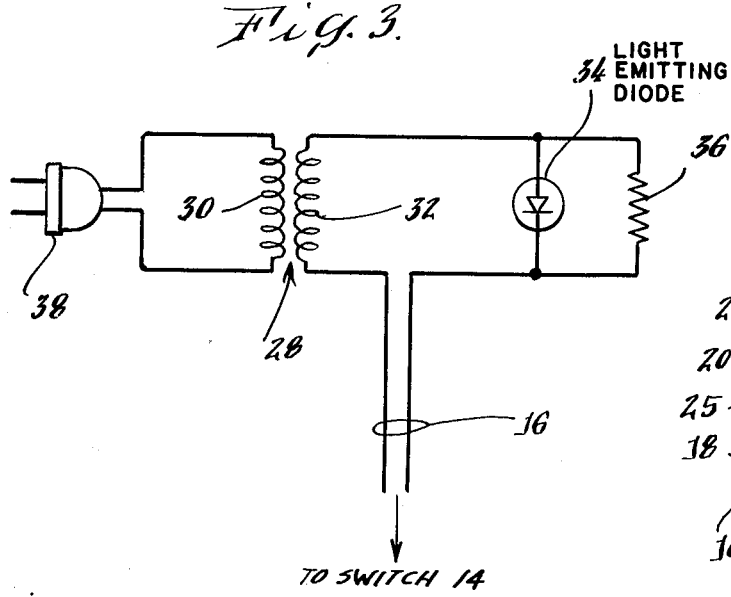
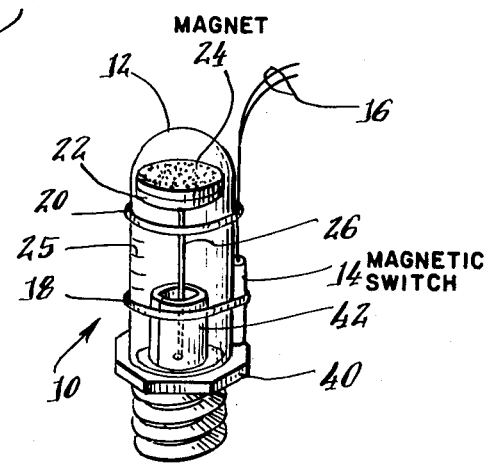

LIQUID LEVEL ALARM FOR REMOTELY INDICATING WHEN LESS THAN A PREDETERMINED QUANTITY OF FUEL OIL REMAINS IN A STORAGE TANK AND METHOD FOR INSTALLING THE SAME

BACKGROUND OF THE INVENTION

The present invention relates to gauges for measuring the quantity of fuel oil within a fuel storage tank of the type commonly installed in homes and business establishments. More specifically, the invention provides an improvement by adaptation of a rising stem type fuel oil measuring gauge.

At present, heating fuel oil consumers measure the quantity of fuel oil remaining within their storage tanks either by measuring gauges mounted directly on or close to the storage tank, or in the alternative, by relying on the degree day system of oil companies. Each of these methods has distinct disadvantages for the consumers.

Firstly, reliance on a degree day system may be ineffective since such a system is based on estimations. If usage patterns differ from the norm on which the degree day system is based, the consumer may have unknowingly used more fuel oil than he suspects, thus running the risk of depleting his storage tank before ordering a refill. More importantly, consumers are using additional sources of heat, such as wood stoves or solar energy, which can adversely affect degree-day calculations.

Likewise, reliance on fuel gauges mounted on or near a fuel storage tank may result in similar consequences. Fuel tanks are generally located in remote areas of a home or business, as for example in basements. Thus, the fuel gauge associated with the tank is not readily observable and the owner may not be conscious of the quantity of fuel oil remaining within the tank. As such, the owner may not be aware of the time when a refill of the tank is needed, thereby running the risk of depleting his entire supply.

A type of fuel-indicating gauge in common use, mounted on the top of fuel oil storage tanks in homes and businesses, is known as a rising stem gauge. This gauge includes a level-indicating element, or disc, mounted horizontally at the upper end of a vertically rising stem, or shaft, enclosed within a transparent tube. The vertically rising shaft extends into the tank and is mechanically connected to a buoyant float which rests on the surface of the liquid within the tank. Markings on the tube correspond to specific quantities of fuel oil remaining in the associated tank. The quantity of fuel remaining within the storage tank is determined by observing which marking on the tube is aligned with the level-indicating disc within the tube.

The present invention provides an improvement by adaption to a rising stem fuel gauge by having means for providing a remote alarm signal to indicate when the quantity of fuel within the storage tank has been depleted to the level that imminent replenishment of fuel oil is necessary.

SUMMARY OF THE INVENTION

The present invention provides an improvement by adaption to a rising stem fuel oil gauge for indicating the quantity of fuel oil remaining within a fuel storage tank at a remote location. The gauge includes a transparent tube mounted on the storage tank, and markings on the tube corresponding to the quantity of fuel oil remaining within the storage tank. Within the tube is a horizontally mounted level indicator disc attached to the upper end of a vertical shaft or stem. The vertical stem extends into the tank and is mechanically actuated by a buoyant float resting on the surface of the liquid within the storage tank. The quantity of fuel oil remaining within the tank at any given time is determined by observing the marking on the tube with which the level indicator is aligned.

A magnet is carried on top of the level indicator and a magnetically-actuated reed switch is mounted on the tube of the gauge at a predetermined position. A power supply and alarm are electrically coupled to the switch. When the level of the indicator within the tube decreases to the point that the magnet is within a predetermined distance from the switch, the switch is actuated by the magnet to complete an electrical circuit between the power supply and the alarm. By mounting the switch at a position on the tube corresponding to a quantity of fuel oil remaining in the tank at which refill is desirable, actuation of the alarm provides an indication that the storage tank should be refilled. The alarm, which can be a light emitting diode, is located in a position within the subject premises, remote from the fuel tank itself, in which the alarm signal is readily observable by occupants of the premises to provide the necessary warning.

BRIEF DESCRIPTION OF THE DRAWINGS

FIG. 1 illustrates in perspective a fuel oil tank of the type commonly installed in residences or business, and a rising stem measuring gauge extending from the top of the tank.

FIG. 2 illustrates in perspective the rising stem measuring gauge of FIG. 1 embodying the improvement of the present invention.

FIG. 3 illustrates an electrical circuit useful in the present invention for providing an alarm signal at a location remote from the rising stem measuring gauge and the storage tank.

FIG. 4 illustrates in perspective a modification of the gauge illustrated in FIG. 2.

DESCRIPTION OF THE PREFERRED EMBODIMENT

The present improvement to the rising stem measuring gauge will now be discussed in detail with reference to FIGS. 1–4 of the drawings.

Referring first to FIG. 1, numeral 2 designates a fuel oil storage tank of the type that is commonly installed in the basements of homes or businesses and can contain up to approximately three hundred and thirty gallons of heating fuel oil. Pipe 4 is provided to transport fuel oil into the storage tank 2. Pipe 6 is provided to allow air to flow into and out of the storage tank 2. A rising stem fuel gauge, indicated generally by the numeral 10, is mounted to the top of the fuel storage tank, and a magnetically actuated switch 14 having a pair of wires 16 extending therefrom is mounted on the side of a transparent tube 12 of the rising stem gauge.

One type of magnetically actuated switch which is useful with the present invention is a conventional reed switch. This type of switch includes one relatively stationary electrical conducting member and a second movable magnetic electrical conducting member spaced apart from the first member. The two members are enclosed within an evacuated tube. When a magnet is placed close to the switch, magnetic forces drive the movable magnetic member into contact with the stationary member to provide a closed path of current flow through the switch.

The rising stem gauge is shown in greater detail in FIG. 2, to which reference is now made. This type of gauge, which generally is known to the art, includes a transparent tube 12 having a series of markings 25 directly on the tube. The tube contains a level-indicating disc 22 mounted on the upper end of a vertically rising shaft 26 which extends into the storage tank 2. As is known to the art, the quantity of fuel oil within the storage tank 2 of FIG. 1 corresponds to the position of the indicator disc in the tube 12. The quantity of fuel oil within the storage tank at any given time is determined by observing the mark on the tube with which the level-indicator is aligned.

A magnet 24 is carried on top of the level indicator 22, and the magnetically actuated switch 14 is mounted to the outside of the tube. The switch is positioned so that it will be actuated by the magnet 24 when the position of the level indicator 22 is within a predetermined distance of the switch 14. As shown in FIG. 2, the switch can be adjustably mounted to the outside of the tube and secured by conventional elements such as a plastic cable tie 18. In the alternative, the magnetic switch can be mounted to the tube by providing a self-sticking backing to the switch. The pair of wires 16 extend from switch 14 and a second plastic tie 20 can be used to hold the wires firmly against the tube. As will be discussed in further detail below, the extending ends of the wires 16 are connected to a source of electrical power and an alarm which is located remotely from the oil tank and the rising stem gauge. It might, for example, be located in the kitchen.

FIG. 3 illustrates an alarm circuit which is connected to the ends of the wires 16 extending from the magnetically actuated switch 14. One of the wires 16 is connected to the forward end of a light emitting diode 34 connected in parallel with a resistor 36. The other wire 16 is connected to the secondary winding 32 of a transformer 28. The primary winding 30 of the transformer is connected to a voltage source, as for example, a common 117 V AC home receptacle, by the plug connector 38. The electrical circuitry of FIG. 3 provides that when switch 14 is actuated to connect the pair of wires 16 to each other, an electrical circuit is completed between the secondary winding 32 and the light emitting diode 34. With the circuit parameters of the secondary winding 34 being 3 V AC and the resistor 36 being 91 ohms, in FIG. 3, the current through the light emitting diode is between 15-20 ma when the diode conducts. Thus, the disclosed circuitry will cause the light emitting diode to conduct, and thus provide a visual signal when the magnetic switch 14 is actuated. The transformer, the light emitting diode, and the resistor can be enclosed within a conventional battery charger/converter of the type now commonly used with battery operated calculators, as is indicated in FIG. 1.

In operation, the fuel tank 2 is filled with fuel oil and the position of the level-indicator in the tube 12 of the rising stem gauge 10 is aligned with the marking on the tube that indicates that the fuel storage tank is filled. As the quantity of fuel within the storage tank is reduced through use, the position of the level-indicator 22 within the tube of the gauge correspondingly drops. When the quantity of fuel oil within the storage tank is sufficiently diminished so that the level-indicator 22 is within a predetermined distance from the magnetic switch 14 mounted on the tube of the gauge, the magnet 24 carried on top of the level-indicator 22 magnetically actuates the switch.

Actuation of the switch activates the alarm circuitry as discussed above to light the light emitting diode. Thus, the light emitting diode provides a visual indication that the quantity of fuel oil remaining in the fuel storage tank is no greater than the quantity which corresponds to the level of the indicator in the tube of the gauge at which the magnet actuates the switch. If the switch is mounted on the tube at a position in which the magnet will actuate the switch when, for example, only one quarter of the fuel oil with the storage tank remains, the light emitting diode will be actuated only when one quarter or less of the fuel oil in the storage tank remains. Thus, actuation of the diode provides a visual indication that refill of the storage tank will be imminently required. Because the switch is movably mounted to the tube of the gauge, the position of the switch relative to the tube, and thus the level at which the switch will be actuated, can be adjusted.

The light emitting diode 34 is mounted remotely from the storage tank and the gauge. As previously discussed, storage tanks and their associated gauges are usually located in out of the way areas of a home or business, as for example in basements. However, the light emitting diode of the present invention can be installed in a more accessible area of a premise, so that its warning signal is likely to be immediately observed by occupants of the premises.

It is also apparent from the above discussion that existing rising stem gauges easily can be retrofitted with the present improvement. The retrofitting operation merely involves mounting a magnet 24 on top of the level indicator 22, mounting a magnetically actuated switch to the tube 12 of the gauge, and providing a light emitting diode and electric circuitry as discussed above so that actuation of the switch by the magnet also actuates the light emitting diode.

Referring back to FIG. 2, it is again noted that when the level of the indicator 22 in the tube 12 decreases to the point that the magnet 24 is within a predetermined distance from the switch 14, the switch will actuate the light emitting diode. However, it is also noted that as the liquid level further decreases, the magnet may move below the predetermined range of switch actuation allowing the switch to open. Whether this occurs depends on the position at which the switch is mounted. If this does occur, the light emitting diode will be turned off when the magnet is below the predetermined distance from the switch. Thus, in this instance, there may be no visual alarm signal from the light emitting diode even though the quantity of fuel within the storage tank may be near depletion.

FIG. 4 illustrates a slightly modified version of the improved gauge which eliminates the above problem. A sleeve such as a plastic tube 42 is placed within the gauge tube 12 around the shaft 26. The sleeve 42 extends in the same direction as the tube 12 and is supported at its lower end by the base of the gauge body 40. The sleeve 42, which is positioned below the level-indicator 22, has an outside diameter that is less than the inside diameter of the tube 12 and an inside diameter greater than the diameter of the shaft 26 and less than the diameter of the level-indicator 22. Thus, sleeve 42 acts as a stop to prevent the level-indicator and the magnet 24 carried thereon from descending to a level below the upper end of the sleeve even if the level of the liquid within tank 2 descends below the level indicated by indicator disc 22. The length of the sleeve is selected so that the level-indicator 22 is stopped when the magnet is within the predetermined range of distance from the switch 14 that will actuate the switch. In this manner, once the switch is initially actuated it will continuously remain on until the quantity of fuel oil in the storage tank is refilled to the degree that the level of the liquid in storage tank 2 is raised to move the indicator disc 22 and magnet 24 above the predetermined range of distance from the switch 14. Thus, a continuous alarm signal will be provided as long as the fuel oil within the storage tank is less than the predetermined quantity resulting in the initial actuation of the switch.

Further modifications of the above described gauge will become apparent to those skilled in the art. Accordingly, the above discussion is intended to be illustrative but not restrictive of the scope of the invention, that scope being defined by the following claims and all equivalents thereto.

We claim:

1. In a rising stem fuel indicating gauge used to measure the quantity of liquid fuel remaining within a fuel storage tank, said indicating gauge being of the type including a tube, a level-indicating element on a shaft within said tube, and indicating markings on said tube for determining the quantity of fuel within said fuel storage tank corresponding to the level of said indicating element in said tube;

the improvement comprising:
a magnetic element carried on said level-indicating element;
a magnetically actuated switch mounted to said tube, said switch being selected so that it is magnetically actuated by said magnetic element carried on said level indicating element when said magnetic element descends in said tube to less than a predetermined distance away from said switch, said switch being mounted on said tube in such position that actuation of said switch by said magnetic element indicates that no more than a predetermined quantity of fuel remains within said fuel storage tank; and
an alarm coupled to said switch for actuation thereof upon the actuation of said switch;
whereby actuation of said alarm provides an indication that no more than said predetermined quantity of fuel remains within said fuel storage tank.

2. An indicating gauge as claimed in claim 1 wherein said alarm includes a light emitting diode (LED) and means for providing electrical power to said LED, said magnetically actuated switch being arranged to complete an electrical circuit between said LED and said means for providing electrical power when said switch is actuated.

3. An indicating gauge as claimed in claim 2 wherein said LED is positioned remotely from said fuel storage tank.

4. An indicating gauge as claimed in claim 1 wherein said alarm is a warning light positioned remotely from said fuel storage tank.

5. An indicating gauge as claimed in claim 1 wherein said magnetically actuated switch is a reed switch.

6. An indicating gauge as claimed in claim 1 further including a sleeve longitudinally arranged within said tube and supported at one end by the base of said gauge, said sleeve having an outside diameter less than the inside diameter of said tube and an inside diameter that is less than the diameter of said level-indicating element but greater than the diameter of said shaft in said tube, said sleeve being of a length sufficient to stop said level-indicating element from descending within said tube below the level at which said magnetically actuated switch is positioned so that said magnetic element carried on said level-indicating element can be maintained substantially in alignment with said switch for continuous actuation of said alarm,
whereby said alarm will be continuously actuated whenever said fuel remaining in said storage tank is less than said predetermined quantity.

7. An indicating gauge as claimed in claim 6 wherein said sleeve is tube shaped.

8. An indicating gauge as claimed in claim 7 wherein said tube shaped sleeve is formed from plastic.

9. An indicating gauge as claimed in claim 1 wherein said magnetically actuated switch is adjustably mounted to said tube so that the predetermined quantity of fuel remaining in the storage tank necessary to actuate said switch and said alarm is variable.

10. In a rising stem fuel indicating gauge used to measure the quantity of liquid fuel remaining within a fuel storage tank, said indicating gauge being of the type including a tube for housing a level-indicating element on a shaft within said tube, and indicating markings on said tube for determining the quantity of fuel within said fuel storage tank corresponding to the level of said indicating element in said tube;

the improvement comprising;
a magnetic element carried on said level-indicating element;
a magnetically actuated switch mounted to said tube, said switch being selected so that it is magnetically actuated by said magnetic element carried on said level indicating element when said magnetic element descends in said tube to less than a predetermined distance away from said switch, said switch being mounted on said tube in such position that actuation of said switch by said magnetic element indicates that no more than a predetermined quantity of fuel remains within said fuel storage tank;
a warning light electrically coupled to said magnetically actuated switch and positioned remotely from said fuel storage tank, and
a sleeve longitudinally arranged within said tube and around said shaft and supported at one end by the base of said gauge, said sleeve being of an outside diameter less than the inside diameter of said tube and being of an inside diameter less than said level-indicating element and greater than said shaft in said tube, said sleeve being of a length sufficient to stop said level-indicating element from descending within said tube below the level at which said magnetically actuated switch is positioned so that said magnetic element carried on said level-indicating element will be maintained substantially in alignment with said switch for continuous actuation of said alarm when said fuel in said storage tank is less than the predetermined quantity.

11. A method of providing an alarm for an existing rising stem fuel indicating gauge used to measure the quantity of fuel remaining within a fuel storage tank, said indicating gauge being of the type including a tube for housing a level-indicating element on a shaft within said tube, and indicating markings on said tube for determining the quantity of fuel remaining in said storage tank corresponding to the level of said indicating element in said tube, the steps of said method including:
positioning a magnetic element on said level-indicating element;
mounting a magnetically actuated switch on said tube, said switch being selected so that it is magnetically actuated by said magnetic element when said magnetic element descends in said tube to less than a predetermined distance from said switch, said switch being mounted to said tube in such position that actuation of said switch by said magnetic element indicates that no more than a predetermined quantity of fuel remains in said storage tank, and
coupling an alarm to said magnetically actuated switch for actuation of said alarm upon actuation of said switch;
whereby actuation of said alarm provides indication that no more than said predetermined quantity of fuel remains within said fuel storage tank.

12. A method as claimed in claim 11 further including the step of:
providing means for stopping said level-indicating element in said tube when said level-indicating element is in substantial alignment with the position of said switch.

* * * * *